US009430447B1

(12) United States Patent
Paglia et al.

(10) Patent No.: US 9,430,447 B1
(45) Date of Patent: Aug. 30, 2016

(54) PRESENTING MEDIA CONTENT BASED ON PARSED TEXT

(71) Applicant: Google Inc., Mountain View, CA (US)

(72) Inventors: Marco Paglia, San Francisco, CA (US); Nathan Stuart Streu, San Francisco, CA (US)

(73) Assignee: Google Inc., Mountain View, CA (US)

( * ) Notice: Subject to any disclaimer, the term of this patent is extended or adjusted under 35 U.S.C. 154(b) by 247 days.

(21) Appl. No.: 13/897,551

(22) Filed: May 20, 2013

(51) Int. Cl.
*G06F 17/21* (2006.01)
(52) U.S. Cl.
CPC ..................................... *G06F 17/21* (2013.01)
(58) Field of Classification Search
None
See application file for complete search history.

(56) References Cited

U.S. PATENT DOCUMENTS

| 6,772,188 | B1 | 8/2004 | Cloutier | |
|---|---|---|---|---|
| 2003/0172005 | A1* | 9/2003 | Hellal et al. | 705/27 |
| 2009/0248516 | A1* | 10/2009 | Gross | G06F 17/30899 705/14.66 |
| 2010/0325542 | A1* | 12/2010 | Esposito et al. | 715/716 |
| 2011/0035662 | A1 | 2/2011 | King et al. | |
| 2011/0258204 | A1* | 10/2011 | Hubbard et al. | 707/749 |
| 2012/0158502 | A1* | 6/2012 | Chung | G06Q 30/0269 705/14.53 |
| 2014/0243028 | A1* | 8/2014 | Colombo et al. | 455/466 |

FOREIGN PATENT DOCUMENTS

| WO | 2005/106643 | 11/2005 |
|---|---|---|
| WO | 2012/088307 | 6/2012 |

\* cited by examiner

*Primary Examiner* — Asher Kells
(74) *Attorney, Agent, or Firm* — Morris & Kamlay LLP

(57) ABSTRACT

Methods and systems are provided for presenting media content based on parsed text. Text may be received and a referenced media entity may be identified in the text. A search may be conducted for media content related to the referenced media entity. A content item may be identified based on a result of the search, and the content item may be presented to a first user. The referenced media entity may be a song, a book, an author, an actor, an artist, an album, a song, a producer, a person, a title, a movie, a concert, a show, a television program, a video, a newspaper, a magazine, a celebrity, a personality, and a character. Additionally, user information about the first user may be received and presentation of the content item may be based on the user information about the first user.

31 Claims, 3 Drawing Sheets

PRESENTING MEDIA CONTENT BASED ON PARSED TEXT

BACKGROUND

Parsing text to present additional information based on terms/phrases in the parsed text can be difficult. In general, text may include references to particular media, and a user may be interested in finding additional information related to the media. However, finding such related information may require time and effort by the user, for example to conduct a search. Further, presentation of the related information may be disconnected from the parsed text. For example, a user may receive an email from a friend referencing a movie. If the user is interested in knowing more about the movie (such as the actors, release date, rating), or if the user is interested in viewing the movie trailer, the user may find it necessary to devote time and effort to search for such related information.

BRIEF SUMMARY

According to an implementation of the disclosed subject matter, text may be received and a referenced media entity may be identified in the text. A search may be conducted for media content related to the referenced media entity. At least one content item may be identified based on a result of the search, and the at least one content item may be presented to a first user.

An implementation of the disclosed subject matter provides a system that includes a processor configured to receive text and identify a referenced media entity in the text. Next, the system may search for media content related to the referenced media entity. At least one content item may be identified based on a result of the search, and the at least one content item may be presented to a first user.

Additionally, an implementation of the disclosed subject matter provides a computer readable medium storing instructions that cause a processor to receive text and identify a referenced media entity in the text. The system may search for media content related to the referenced media entity. Next, at least one content item may be identified based on a result of the search, and the at least one content item may be presented to a first user.

Implementations of the disclosed subject matter may improve a user's ability to obtain relevant information and content related to media that has been referenced in text. The disclosed subject matter provides users with information and links that may make it easier for a user to access media that is relevant and important to the user, which may result in an improved user experience. Additional features, advantages, and embodiments of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
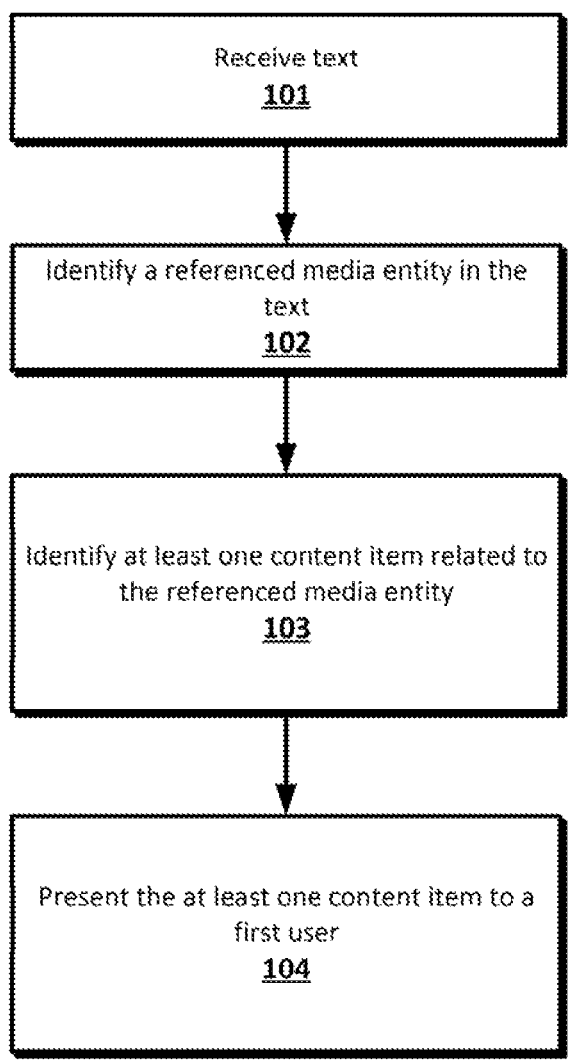
FIG. 1 shows an example process according to an implementation of the disclosed subject matter.
Figure 2:
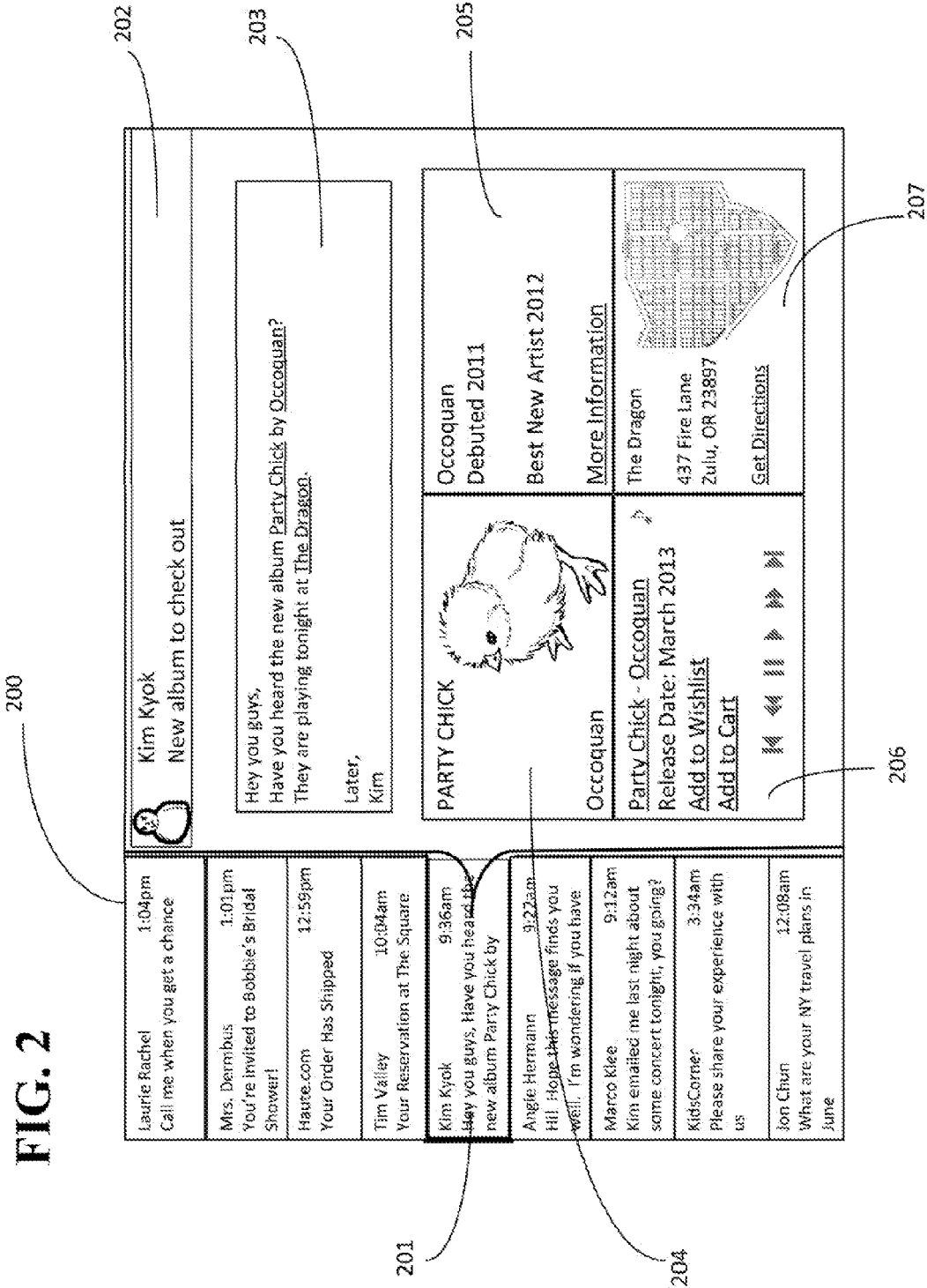
FIG. 2 shows an example interface according to an implementation of the disclosed subject matter.

A variety of information, such as terms and/or phrases, can be present within written text. These terms and/or phrases may include references to media entities such as books, movies, actors, songs, albums, artists, actors, and the like. Within a paragraph, there may be references to specific books, movies, songs, albums, actors, musicians, application or other items. Information related to those items may not be immediately apparent based on the references contained within the text. It may be advantageous to automatically retrieve and present additional information related to media entities referenced by written text and present this additional information to a user viewing the text.

The present disclosure provides methods and systems for presenting content items, which relate to media entities referenced within scanned text. A user interface may present different kinds of media content related to media entities mentioned within a text form such as an email, a web form, a text message, and the like. Specifically, the text form may be scanned to identify media entities referenced within the text form. A search may be performed, based on the media entities identified, to retrieve additional media content information related to the media entities. The additional media content information relevant to the media entities may be presented to the user.

The media content information related to the media entities may be displayed simultaneously with the scanned text. Furthermore, the media content information may be presented proximate to the location of the media entity in the scanned text. For example, the media content information may be displayed next to the same sentence or paragraph in which the media entity appears, on the same page, on the same screen, and the like. The media content information may further include information that has been personalized for the user viewing the text. For example, the media content information may include social media input from the user's social network connections, star ratings given by the user's social network connections, reviews authored by the user's social network connections, and the like.

Further, by recognizing the media entity, the system may provide quick action options associated with the media entity, such as adding the media to a wishlist, adding the media to the user's cart from a content provider, viewing a trailer, previewing the media item, and the like.

For example, a user may receive an email from a friend mentioning the movie Fight Club. The text of the email may be scanned, and a reference to the movie Fight Club may be detected. By detecting the reference to the movie Fight Club, the system may provide the user with media information related to the movie Fight Club. This media information may include basic information related to the movie such as release date, actors, motion picture rating, and the like. This media information may also include social media input such as comments regarding the movie made by the user's friends, star rating given to the movie by the user's friends, and the like. Additionally, the system may provide the user with a quick action item related to the movie Fight Club, such as an interface for watching the trailer for the movie, adding the movie to the user's wish list from a content provider, adding the movie to the user's cart from a media content provider, and the like. This additional information (including links to additional information) may be made accessible to the user on the same screen as the email message that contains the reference.

More generally, an implementation of the disclosed subject matter provides a method for presenting a content item to a user, as shown in FIG. 1. The method may include receiving text at 101, and identifying a referenced media entity in the text at 102. A content item may be identified related to the referenced media entity at 103, and the content item may be presented to a first user at 104.

An implementation of the disclosed subject matter provides a system that includes a processor configured to receive text and identify a referenced media entity in the text. The system may search for media content related to the referenced media entity. Next, the system may identify a content item based on a result of the search, and present the content item to a first user.

According to an implementation of the disclosed subject matter, a computer readable medium storing a plurality of instructions that cause a processor to receive text is provided. A referenced media entity may be identified in the text. A content item may be identified related to the referenced media entity, and the content item may be presented to a first user.

Additionally, identifying at least one content item may also include searching for the at least one content item from among a plurality of content items related to the referenced media entity.

Further, according to an implementation of the disclosed subject matter, user information about the first user may be received and presentation of the content item may be based on the user information about the first user. For example, the user information may include the user's geographic location, the generator or sender of the text's geographic location or a geographic location specified by the sender, media preferences, media purchase history, media viewing history, social media profile, display preferences and other user information upon which the content item may be based. Further, presentation of content items may be prioritized based on the user information received from the first user. For example, the system may present a content item based on the user's geographic location, such as a map to a local venue where a referenced media entity, such as a band, will be performing. The system may prioritize presentation of this map over presentation of other content items that may not be based on the user information.

As an example, upon scanning received text, the system may identify the media entity Da Vinci Code. The system may search for media content related to the Da Vinci Code. As a result of the search, the system may identify a content item related to Da Vinci Code such as an image of The Da Vinci Code book cover and information about the book, for example, the release date, biographical information and a text or video interview of author Dan Brown, and the identity of the publisher. Based on the user information such as media preferences and media purchase history, it may be determined that the user prefers action/suspense books and has previously purchased books by Dan Brown. As a result, the system may present content items that include links to a content provider from which the user can purchase books by an author other than Dan Brown that are action/suspense and/or categorized as being similar to books by Dan Brown. Also, the system may identify content items related to author Dan Brown, such as other books by Dan Brown. The system may present content items that include links to a content provider from which the user can purchase books by Dan Brown that the user has not already purchased. As an example, presentation of content items that are based on user information may be prioritized over other content items that are not based on user information.

As discussed above, the referenced media entity may be a song, a book, an author, an actor, an artist, an album, a song, a producer, a person, a title, a movie, a concert, a show, a television program, a video, a newspaper, a magazine, a celebrity, a personality, a character, and any other similar media entity that may be related to media content. For example, a media entity may be the album Sasha Fierce, the song Halo, or the music video for the song Single Ladies. Additionally, a media entity may be related to media, in which case, media may be a book, an album, a song, a movie, a ticket to an event, a show, a video, a newspaper, or a magazine. In general, a media entity may itself be media or a media entity may be related to media. As another example, a media entity may be the artist Beyonce, and media related to Beyonce may include the album Sasha Fierce, the song Halo, the music video for Single Ladies, and any other media related to Beyonce.

A content item that is presented to a user may be in various forms, such as a media content item, for example an interface, information, an image, a link, an action item, and the like. For example, a content item may be an interface that allows the media entity to be played, an interface presenting information (or a link to information) relating to the referenced media entity, an interface presenting social media information relating to the referenced media entity, and the like. As an example, for a media entity such as the song Paradise, a content item may be an interface that allows the user to play the song. Further, a content item may be information relating to the song Paradise, such as the artist, release date, album, and the like. A content item may also be an interface presenting social media input by the user's social media contacts regarding the song Paradise. For example, social media input may be star ratings, comments, reviews, and the like, given by the user's social media contacts.

Furthermore, a content item may also be a link to a content provider from which the first user may be able to purchase the referenced media entity, a link to add media relating to the referenced media entity to a wish list provided by a content provider from which the first user is able to purchase the media, and the like. Additionally, a content item may be a link to a content provider from which the first user may be able to purchase media relating to the referenced media entity. For example, for a media entity such as the book Life of Pi, a content item may be a link to a content provider from which the user may be able to purchase media, such as the book Life of Pi. A content item may be a link to add the book Life of Pi to the user's wish list provided by a content provider from which the user can purchase the book. As another example, for a media entity such as Brad Pitt, a content item may be link to a content provider from which the first user may be able to purchase the movie Fight Club (in which Brad Pitt is an actor).

Figure 3:
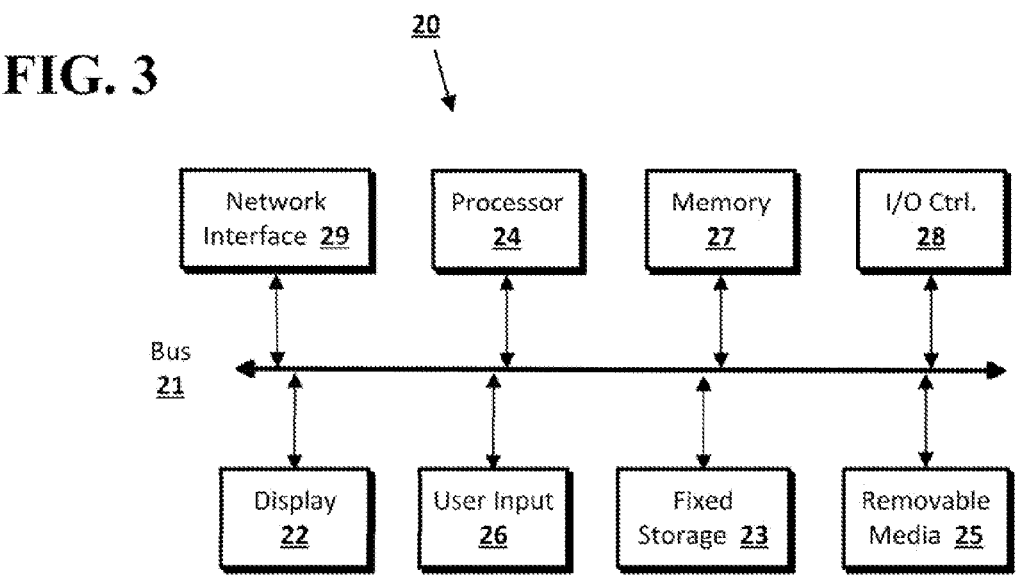
FIG. 3 shows a computer according to an embodiment of the disclosed subject matter.

According to an implementation of the disclosed subject matter, the text may be received from a second user and the text may be human generated. The text may also be machine generated. For example, the text can be an advertisement. As an example, FIG. 3 shows an email inbox 200 displaying email messages received by a user. As shown, the user may have received an email 201, which is entitled "New album to check out" as shown at 202. The body of the email 203 includes text, received from a second user, which has been human generated. The email 203 references the album titled "Party Chick" by the artist "Occoquan" and indicates that they will be playing at a venue "The Dragon." The text may be scanned and the media entities Party Chick and Occoquan may be identified. A search may be performed and content items 204, 205, 206, and 207 may be identified, and each content item may be related to the referenced media entities Party Chick and Occoquan. Specifically, content item 204 may be an interface presenting information relating to both media entities Party Chick and Occoquan, such as an image of the Party Chick album cover. Content item 205 may also be an interface presenting information relating to the media entity Occoquan, such as the year the artist debuted, awards and accolades. Content item 205 may also include a link to information relating to the artist Occoquan. Content item 206 may be an interface that allows the album Party Chick to be played. Further, content item 206 may include links to a content provider from which the user can add the Party Chick album to his wish list or cart for purchase from the content provider.

Further, content item 207 may be an interface presenting information based on user information about the user. For example, the user information may include information about the user's geographic location. Based on this user information, the content item 207 may provide information about a local venue at which the referenced media entity, Occoquan, will be performing. The interface 207 may include the address and map of the local venue, and may further include a link to a map provider from which the user can receive directions to the venue.

As another example, a user may receive an email from a first friend referencing the album Diamonds. The system may identify the referenced media entity, the album Diamonds, in the text of the email. A search may be performed for media content related to the album Diamonds, and a content item may be identified. The content item may be an interface that allows the album Diamond to be previewed. For example, the content provider may allow a user to listen to a 30 second portion of each song on the album Diamond. Additionally, the content item may include information based on the user's social media information. For example, the content item may include star ratings, comments, and/or reviews from the user's social media contacts. Further, the content provider may provide the user with one free listen of the entire album Diamonds if one of the user's friends has previously purchased the album. As an example, although the album Diamonds was mentioned in an email from a first friend, if the first friend has not purchased the album, the user may still be allowed to listen to the entire album one time for free if a second friend of the user has previously purchased the album. Furthermore, the first friend, from which the user received an email referencing the media entity, may or may not be within the user's social media network.

In situations in which the implementations of the disclosed subject matter collect personal information about users, or may make use of personal information, the users may be provided with an opportunity to control whether programs or features collect user information (e.g., user's geographic location, media preferences, media purchase history, media viewing history, social media profile, and other user information upon which a content item may be based), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server Embodiments of the presently disclosed subject matter may be implemented in and used with a variety of component and network architectures. FIG. 3 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
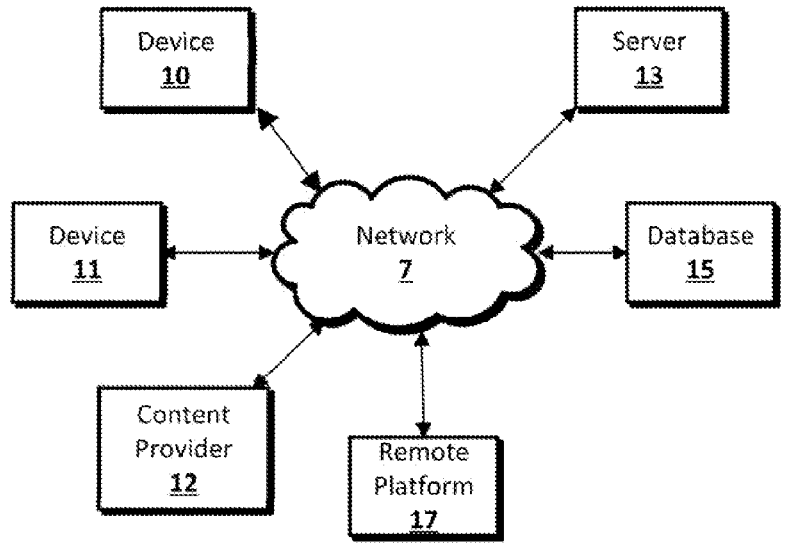
FIG. 4 shows a network configuration according to an embodiment of the disclosed subject matter.

FIG. 4 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13, content provider 12, and/or databases 15. The devices and/or content provider 12 may be directly accessible by the clients 10, 11 or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
receiving text;
identifying a referenced media entity in the text;
identifying a plurality of content items related to the referenced media entity;
receiving user information about a first user, the user information including information about the first user's connection to a social network; and
presenting to the first user at least one interface including at least one identified content item based on the user information and an option to use the at least one identified content item on at least a limited basis based on whether the user information indicates that a second user connected to the first user via the social network has purchased the at least one identified content item, wherein presenting the interface includes presenting at least one of a social media comment from the second user connected to the first user via the social network, a rating given by the second user, or a review authored by the second user.

2. The method of claim 1, wherein the step of identifying the plurality of content items further comprises searching for at least one content item from among a plurality of content items related to the referenced media entity.

3. The method of claim 1, wherein the text is received from another user via email or text message.

4. The method of claim 1, wherein the text is human generated.

5. The method of claim 1, wherein the referenced media entity is selected from the group consisting of a song, a book, an author, an actor, an artist, an album, a song, a producer, a person, a title, a movie, a concert, a show, a television program, a video, a newspaper, a magazine, a celebrity, a personality, and a character.

6. The method of claim 1, wherein the at least one identified content item is an interface that allows the media entity to be played.

7. The method of claim 1, wherein the at least one identified content item is a link to a content provider from which the first user is able to purchase media relating to the referenced media entity.

8. The method of claim 7, wherein media is selected from the group consisting of a book, an album, a song, a movie, a ticket to an event, a show, a video, a newspaper, or a magazine.

9. The method of claim 1, wherein the at least one identified content item is a link to a content provider from which the first user is able to purchase the referenced media entity.

10. The method of claim 1, wherein the at least one identified content item is a link to add media relating to the referenced media entity to a wish list provided by a content provider from which the first user is able to purchase the media.

11. The method of claim 1, wherein the at least one identified content item is an interface presenting information relating to the referenced media entity.

12. The method of claim 1, wherein the at least one identified content item is an interface presenting social media information relating to the referenced media entity.

13. The method of claim 1, wherein the user information is at least one selected from the group consisting of: geographic location, media preferences, media purchase history, media viewing history, social media profile, and other user information upon which the at least one content item is based.

14. A system, comprising:
a processor configured to:
receive text;
identify a referenced media entity in the text;
identify a plurality of content items related to the referenced media entity;
receive user information about a first user, the user information including information about the first user's connection to a social network; and
present to the first user at least one interface including at least one identified content item based on the user information and an option to use the at least one identified content on at least a limited basis based on whether the user information indicates that a second user connected to the first user via the social network has purchased the at least one identified content item,
wherein presenting the interface includes presenting at least one of a social media comment from the second user connected to the first user via the social network, a rating given by the second user, or a review authored by the second user.

15. The system of claim 14, wherein the step of identifying the plurality of content items further comprises searching for at least one content item from among a plurality of content items related to the referenced media entity.

16. The system of claim 14, wherein the text is received from another user via email or text message.

17. The system of claim 14, wherein the text is human generated.

18. The system of claim 14, wherein the referenced media entity is selected from the group consisting of a song, a book, an author, an actor, an artist, an album, a song, a producer, a person, a title, a movie, a concert, a show, a television program, a video, a newspaper, a magazine, a celebrity, a personality, and a character.

19. The system of claim 14, wherein the at least one identified content item is an interface that allows the media entity to be played.

20. The system of claim 14, wherein the at least one identified content item is a link to a content provider from which the first user is able to purchase media relating to the referenced media entity.

21. The system of claim 20, wherein media is selected from the group consisting of a book, an album, a song, a movie, a ticket to an event, a show, a video, a newspaper, or a magazine.

22. The system of claim 14, wherein the at least one identified content item is a link to a content provider from which the first user is able to purchase the referenced media entity.

23. The system of claim 14, wherein the at least one identified content item is a link to add media relating to the referenced media entity to a wish list provided by a content provider from which the first user is able to purchase the media.

24. The system of claim 14, wherein the at least one identified content item is an interface presenting information relating to the referenced media entity.

25. The system of claim 14, wherein the at least one identified content item is an interface presenting social media information relating to the referenced media entity.

26. The system of claim 14, wherein the user information is at least one selected from the group consisting of: geographic location, media preferences, media purchase history, media viewing history, social media profile, and other user information upon which the at least one content item is based.

27. A non-transitory computer readable medium storing a plurality of instructions that cause a processor to:
receive text;
identify a referenced media entity in the text;
identify a plurality of content items related to the referenced media entity;
receive user information about a first user, the user information including information about the first user's connection to a social network; and
present to the first user at least one interface including at least one identified content item based on the user information and an option to use the at least one identified content item on at least a limited basis based on whether the user information indicates that a second user connected to the first user via the social network has purchased the at least one identified content item,
wherein presenting the interface includes presenting at least one of a social media comment from the second user connected to the first user via the social network, a rating given by the second user, or a review authored by the second user.

28. The computer readable medium of claim 27, wherein the step of identifying the plurality of content items further comprises searching for the at least one content item from among a plurality of content items related to the referenced media entity.

29. The computer readable medium of claim 27, wherein the at least one identified content item is an interface that allows the media entity to be played.

30. The computer readable medium of claim 27, wherein the at least one identified content item is a link to a content provider from which the first user is able to purchase media relating to the referenced media entity.

31. The computer readable medium of claim 27, wherein the at least one identified content item is a link to a content provider from which the first user is able to purchase the referenced media entity.

* * * * *